United States Patent
Balram et al.

(10) Patent No.: US 7,903,178 B1
(45) Date of Patent: **\*Mar. 8, 2011**

(54) COLOR MANAGEMENT UNIT

(75) Inventors: Nikhil Balram, Mountain View, CA (US); Sujith Srinivasan, Bangalore (IN); Bipasha Ghosh, Bangalore (IN); Sanjay Garg, Bangalore (IN)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/787,142

(22) Filed: May 25, 2010

Related U.S. Application Data

(63) Continuation of application No. 11/296,185, filed on Dec. 7, 2005, now Pat. No. 7,746,411.

(51) Int. Cl.
- *H04N 5/45* (2006.01)
- *H04N 5/52* (2006.01)
- *H04N 5/14* (2006.01)
- *H04N 5/57* (2006.01)
- *H04N 9/67* (2006.01)
- *H04N 9/73* (2006.01)
- *G09G 5/02* (2006.01)
- *G09K 9/00* (2006.01)
- *G09K 9/34* (2006.01)

(52) U.S. Cl. ......... 348/649; 348/656; 348/657; 348/661; 348/672; 348/673; 348/678; 348/687; 345/589; 345/603; 345/604; 382/167; 382/171

(58) Field of Classification Search .................. 348/649, 348/656, 657, 661, 672, 674, 678, 687; 345/589, 345/603, 604; 358/520; 382/167, 169
See application file for complete search history.

(56) References Cited

U.S. PATENT DOCUMENTS

| | | | |
|---|---|---|---|
| 5,227,863 A | 7/1993 | Bilbrey et al. |
| 5,875,260 A | 2/1999 | Ohta |
| 6,078,686 A | 6/2000 | Kim |
| 6,157,415 A | 12/2000 | Glen |
| 6,462,786 B1 | 10/2002 | Glen et al. |
| 6,724,435 B2 | 4/2004 | Segman |
| 6,771,320 B2 | 8/2004 | Choi |
| 6,832,000 B2 | 12/2004 | Herman et al. |
| 6,903,782 B2 | 6/2005 | Herman et al. |
| 6,992,683 B2 | 1/2006 | Shin et al. |
| 7,015,927 B2 | 3/2006 | Matsushiro et al. |
| 7,042,521 B2 | 5/2006 | Kim |
| 7,102,695 B2 | 9/2006 | Han et al. |
| 7,167,277 B2 | 1/2007 | Shimizu et al. |
| 7,184,080 B2 | 2/2007 | Kehtarnavaz et al. |
| 7,231,085 B2 | 6/2007 | Aotsuka |
| 7,289,164 B2 | 10/2007 | White |
| 7,315,397 B2 | 1/2008 | Nishimura |
| 7,443,453 B2 | 10/2008 | Hsu et al. |
| 7,483,042 B1 | 1/2009 | Glen |
| 2002/0172417 A1 | 11/2002 | Nicolas |
| 2003/0095706 A1 | 5/2003 | Kuwata |
| 2004/0170319 A1 | 9/2004 | Maurer |

(Continued)

*Primary Examiner* — Brian Yenke

(57) ABSTRACT

A color management unit is architected to achieve higher-quality appearance used in various video formats and to enable improvements in picture contrast and colorfulness. The color management unit comprises an optional input color space converter to convert the input digital video to a desired color space, an adaptive contrast enhancer to apply contrast improvement algorithms in response to different scenes in either manual or automatic modes, intelligent color remapping for enhancing selected colors, sRGB compliance to produce a video display that is uniform over different monitors, global color and brightness controls to combine global processing and color conversion, gamut compression to maintain pixel validity in color space conversion, and gamma correction to compensate for nonlinear characteristics of an output display.

20 Claims, 9 Drawing Sheets

U.S. PATENT DOCUMENTS

| | | |
|---|---|---|
| 2004/0263456 A1 | 12/2004 | Miyachi et al. |
| 2005/0013503 A1 | 1/2005 | Park et al. |
| 2005/0083345 A1 | 4/2005 | Higgins |
| 2005/0083352 A1 | 4/2005 | Higgins |
| 2005/0219574 A1 | 10/2005 | Ok et al. |
| 2007/0036456 A1 | 2/2007 | Hooper |
| 2007/0070369 A1 | 3/2007 | Wang |
| 2007/0115392 A1 | 5/2007 | Masuda et al. |

COLOR MANAGEMENT UNIT

CROSS REFERENCE TO RELATED APPLICATION

This is a continuation of co-pending, commonly assigned U.S. patent application Ser. No. 11/296,185 filed Dec. 7, 2005, which is incorporated by reference herein in its entirety.

FIELD OF THE INVENTION

The present invention relates generally to image and video processing, and more particularly to color management in image signals.

BACKGROUND OF THE INVENTION

Color enhancement is one of the most common processing tasks used in digital displays and video equipment. Color processing and enhancement should be computationally efficient and easy-to-use. The color management is usually performed on digital video data using logic implemented by dedicated hardware implemented on an ASIC. In this environment, color management should be easy to implement and program, should use as few gates as possible and most importantly should not cause undesirable artifacts in the output picture. Because video enhancements are usually judged by visual inspection and the effect they have on viewers, artifacts refer to visually unpleasant portions in an output picture such as loss of details, contouring etc.

Color enhancements are usually performed on data that is in the YCbCr format. Since YCbCr is commonly used for video transmission and interchange this usually obviates the need for color space conversions. The YCbCr format has the advantage that the color information of a pixel is isolated from the brightness or luminance information. Accordingly, color processing is cleanly and/or intuitively defined in YCbCr format and simple to implement as opposed to, for example, data in RGB form.

Conventional color enhancements include the common features of changing brightness, contrast, saturation and hue of the whole picture at one time. In other words, the controls are global across the entire video stream and are independent of pixel color and location. A typical requirement in modern video processing is to selectively adjust different colors in a picture independently of each other. For example, it may be required to make red pixels more yellowish and sky blue pixels more vivid while keeping all other pixels unmodified.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
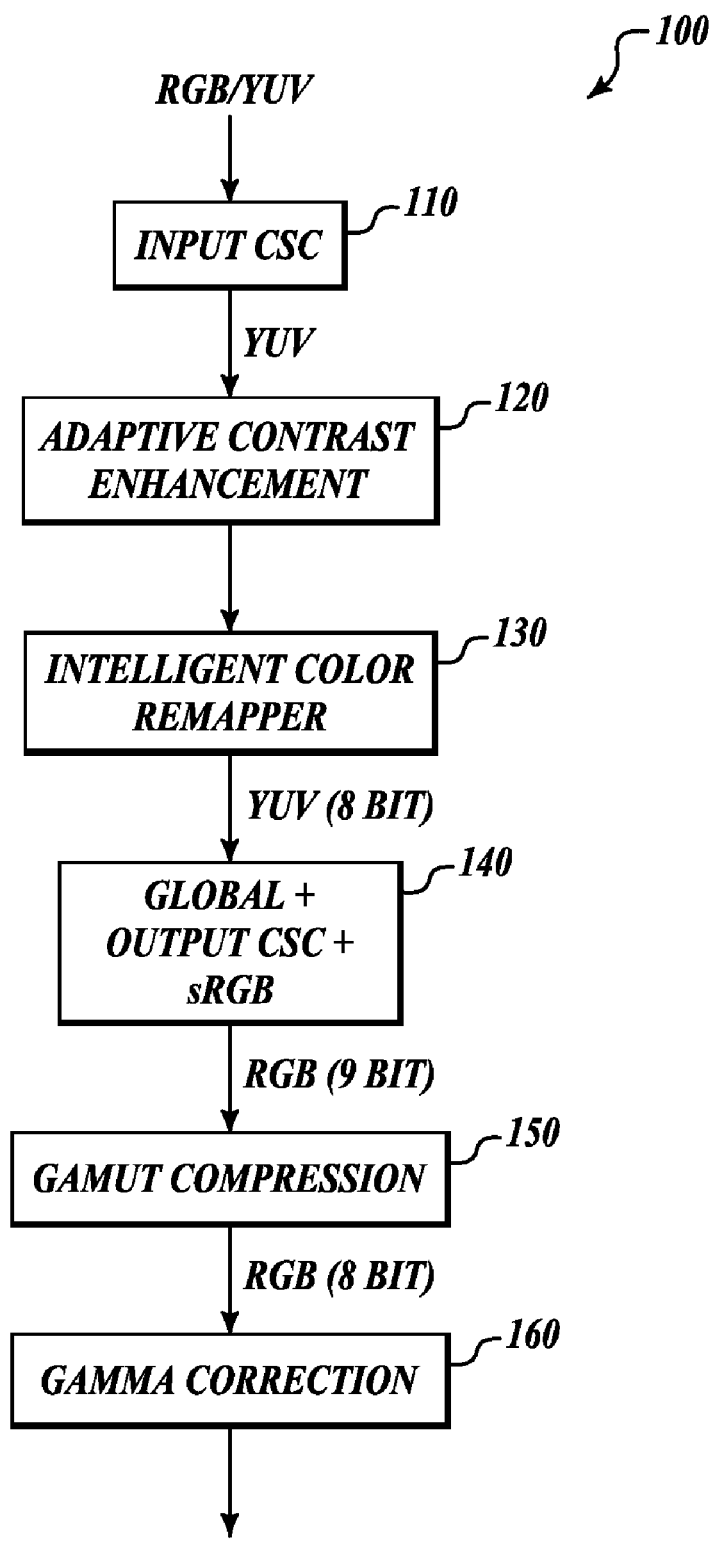
FIG. 1 is a block diagram of an example color management unit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a color management unit that is architected to achieve higher-quality appearance used in various video formats and to enable improvements in picture contrast and colorfulness. The color management unit comprises an optional input color space converter to convert the input digital video to the desired color space, an adaptive contrast enhancer to apply contrast improvement algorithms in response to different scenes in manual or automatic modes, intelligent color remapping for enhancing selected colors, sRGB compliance to produce a video display that is uniform over different monitors, global color and brightness controls to combine global processing and color conversion, gamut compression to maintain pixel validity in color space conversion, and gamma correction to compensate for nonlinear characteristics of an output display.

FIG. 1 is a block diagram of an example color management unit. Color Management Unit (CMU) 100 comprises an optional input color space converter (110), an adaptive contrast enhancer (120), an intelligent color remapper (130), an sRGB compliance unit (140), a gamut compressor (150), and a gamma corrector (160). As discussed above, CMU 100 is typically implemented to be used for color processing for various video formats. CMU 100 is also typically implemented on a single integrated circuit, although the CMU can be implemented on multiple integrated circuits.

The optional input color space converter (110) is used to convert an input video signal to a proper format, should the conversion be desired. The YCbCr color space is typically used for color management because the luminance and color information are separate and can be processed independently. The YCbCr color space is also one of the common video exchange formats that is currently used. "Y" is the luminance (usually referred to as luma) of the video while "Cb" and "Cr" are the chroma or color components. Another advantage of transmitting signals in YCbCr format is that the bandwidth of the signal can also be reduced by down-sampling the chrominance signals. Down-sampling is visually acceptable because the human vision system is typically more sensitive to brightness than to color. Y, Cb and Cr are usually assigned values ranging from 0 to 255 in an 8-bit system. When an offset of 128 is removed from Cb and Cr, the YCbCr space is referred to as the YUV space. In YUV space, U and V range from –128 to 127.

Data in RGB format can be converted to YUV using a set of linear equations such as:

$$\begin{pmatrix} Y \\ U \\ V \end{pmatrix} = \begin{bmatrix} 0.299 & 0.587 & 0.114 \\ -0.172 & -0.339 & 0.511 \\ 0.511 & -0.428 & -0.083 \end{bmatrix} \begin{pmatrix} R \\ G \\ B \end{pmatrix} \quad (1)$$

where R, G, B and Y range from 0 to 255 while U and V range from –128 to 127. In the following example system, an 8-bit system is demonstrated. The conversion coefficients in equation (1) are specified by the ITU-601 specification (SDTV) video standard. The inverse equation is used to convert YUV signals into an RGB format as follows:

$$\begin{pmatrix} R \\ G \\ B \end{pmatrix} = \begin{bmatrix} 1 & 0 & 1.371 \\ 1 & -0.698 & -0.336 \\ 1 & 1.732 & 0 \end{bmatrix} \begin{pmatrix} Y \\ U \\ V \end{pmatrix} \quad (2)$$

The adaptive contrast enhancer (120) is used to apply contrast improvement algorithms in response to different scenes or manual or automatic modes. The adaptive contrast enhancer (120) operates using luma information and enhances an image by improving the contrast of the image.

Figure 2:
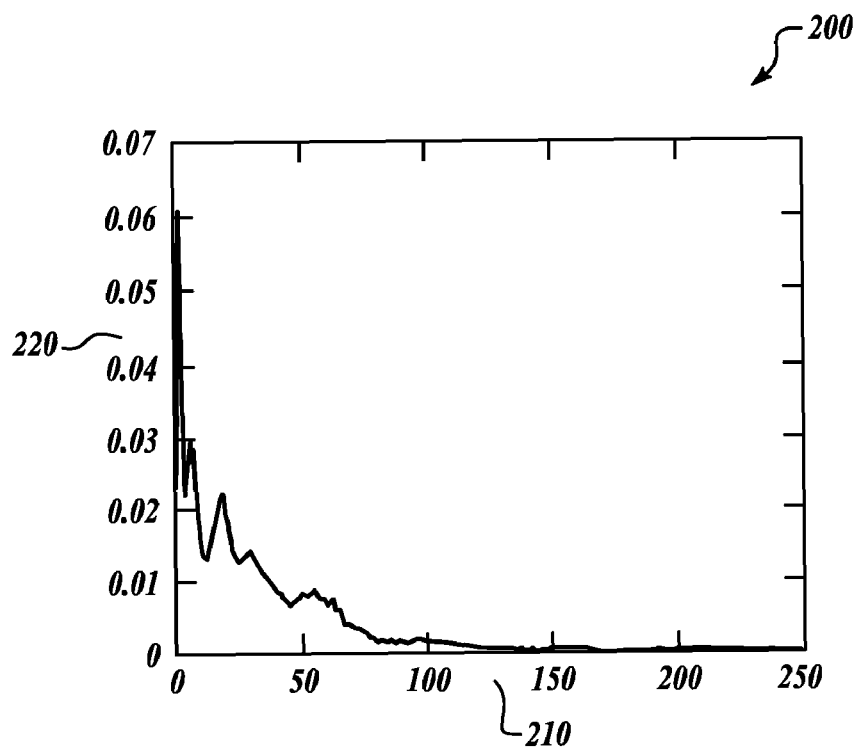
FIG. 2 is an example pre-processing histogram of an image.

FIG. 2 is an example pre-processing histogram of an image. Histogram equalization is an image processing technique that is used to improve picture contrast. Histograms of an image typically illustrate a count of the number of pixels of the image at each luma level. The x-axis (210) of the histogram 200 represents luma values that range from 0 to 255. The y-axis (220) is used to represent the number of pixels at each luma value. When the values on the y-axis are divided by the total number of pixels in the image, the values represent the probability or frequency of occurrence of each such luma value in that image. In the example histogram 200, the frequency of occurrence is shown as a probability density function (pdf). The histogram provides a wealth of information about the brightness properties of the image but spatial information is not ordinarily preserved. Thus images have an associated histogram, but histograms are not used to derive an image.

Figure 3:
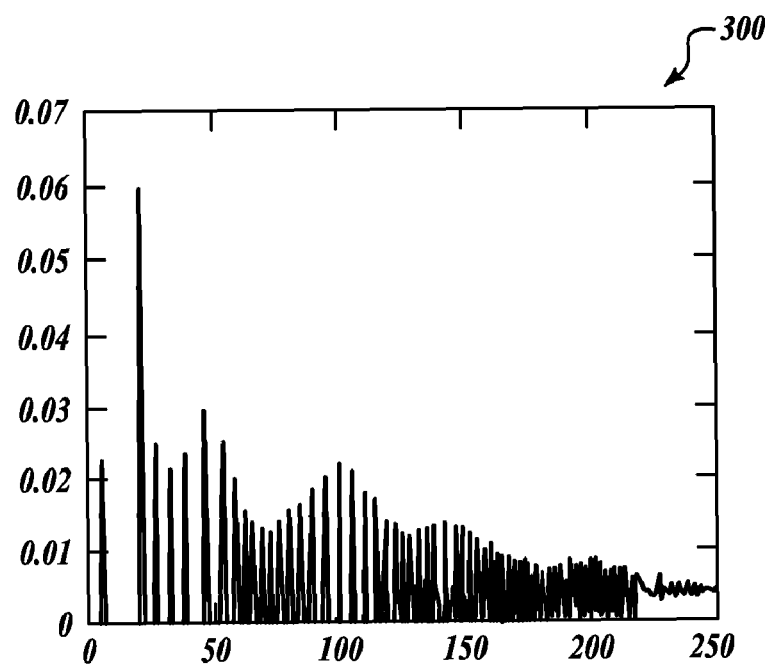
FIG. 3 is an example histogram of an image that has been equalized.

FIG. 3 is an example histogram of an image that has been equalized. Histogram equalization operates in accordance with the principle that images with good contrast typically have uniform histograms. (In practice, there may be exceptions.) Skewing histograms to low luma values (or concentrating the histograms within a particular range of luma values), the appearance of the image can be improved with contrast enhancement.

Histogram equalization attempts to "stretch" the histogram to improve the picture contrast. Comparing histogram 200 with histogram 300, it is evident that the stretching is performed more at the peaks of the histogram while compression is performed at the troughs of the histogram.

Mathematically, histogram equalization can be described as follows: Let n be the total number of pixels in the image and $n_k$ be the number of pixels with luma value $y_k$. Then, the probability density function (pdf) of the input image can be defined as $$f_k(y) = \frac{n_k}{n} \text{ and}$$

the cumulative density function (cdf) can be defined as $$F_k(y) = \sum_{i=0}^{i=k} f_k(y_i).$$

An example cdf at any luma $y_k$ represents the probability of a pixel having a luma value equal to or less than $y_k$ in the image. The cdf is a non-decreasing function that varies from $F_k(0)$ (the probability of points with luma value 0) to $F_k(255)=1$ (the probability of points with luma value being less than or equal to 255).

Where $y_{min}$ is the lowest luma value present in an image and $y_{max}$ is the highest present in the image, for every input pixel $y_{in}$ the output $y_{eq}$ can be given by $$y_{eq} = y_{min} + (y_{max} - y_{min}) F_k(y_{in}) \quad (3)$$

Thus for every input pixel, Equation (3) gives a mapping to find the output in accordance with the cdf.

Figure 4:
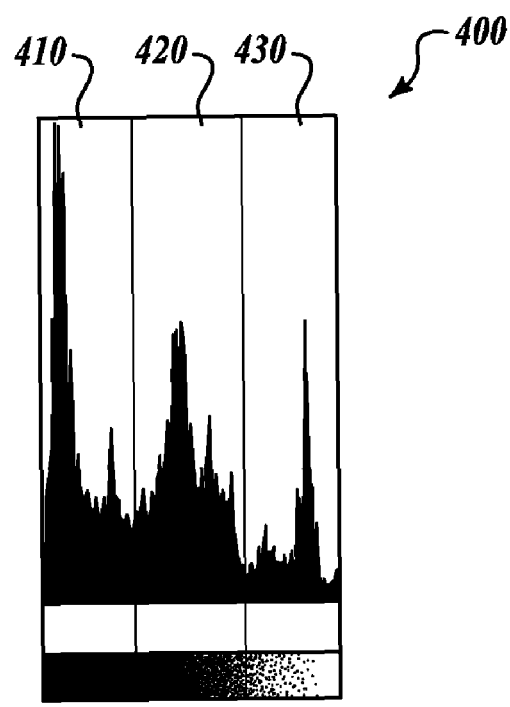
FIG. 4 is an example histogram of an image that has been into three regions in accordance with the present invention.

By itself, histogram equalization is not typically used in conventional contrast enhancement because it is prone to contouring, noise enhancement and gray level crushing. In an embodiment adaptive contrast enhancement scheme, the histogram is first divided into three equally spaced regions, corresponding to "shadows", "mid-tones" and "highlights" in standard terminology used in photography, where the cdf of each region is found separately. FIG. 4 is an example histogram of an image that has been into three regions in accordance with the present invention.

The splitting of the histogram (400) into three regions facilitates processing each region independently of the other. Splitting the image into regions such as a dark region (410), a mid-level brightness region (420), and a bright region (430) allows independent processing of the regions in accordance with the kind of region. For example, a greater level of enhancement is desired in the dark regions of the image to obtain a perceptually more pleasing image. Compared to the dark regions, the mid level regions and bright regions of the image are typically enhanced less. Dividing the histogram and treating each partition separately enables this functionality.

The output pixel is then found using the equation $$y_{out} = wf \times y_{eq} + (1 - wf) \times y_{in} \quad (4)$$

where $y_{eq}$ can be calculated from equation (3) and $y_{in}$ is the brightness of the original pixel. Equation (4) provides a weighted average between the original and equalized values for each pixel where wf is a weighting factor that can range from 0 to 1. The values $y_{eq}$ and wf are typically calculated for each of the three regions independently. The blending process controls the level of contrast enhancement for each region.

As shown in equation (4), the weighting factors control the level of blending between equalized and original luma values, and thus control the level of enhancement. In the example contrast enhancement scheme, the weighting factors are calculated automatically using an approximate variance of the histogram (again separately by region). First the arithmetic mean of each region is calculated using $$m_i = \frac{\sum_j y_j}{N} \qquad (5)$$

where $y_j$ represents luma of points in a particular region i and N is the total number of points in that region. The index i can be (for example) 0, 1 or 2 for dark, mid-level, and bright regions of the histogram.

Using the means, the variances of each region can be calculated using $$\sigma_i = \frac{1}{N} \sum_j n(y_j)(|y_j - m_i|) \qquad (6)$$

where $n(y_j)$ is a count of the number of pixels of luma $y_j$ and $\sigma_i$ is the variance of the ith region. The summation is typically carried out only for points of a single region to get the variance of that region. In the example equation, $\sigma_i$ is an approximation of the true variance. Calculating a more exact variance involves more multipliers and a square root operation (which is computationally intensive and/or requires a significant amount of circuitry to implement). Using the approximate variance shown above produces visually appealing results while reducing hardware requirements (over calculating a more exact variance).

Figure 5:
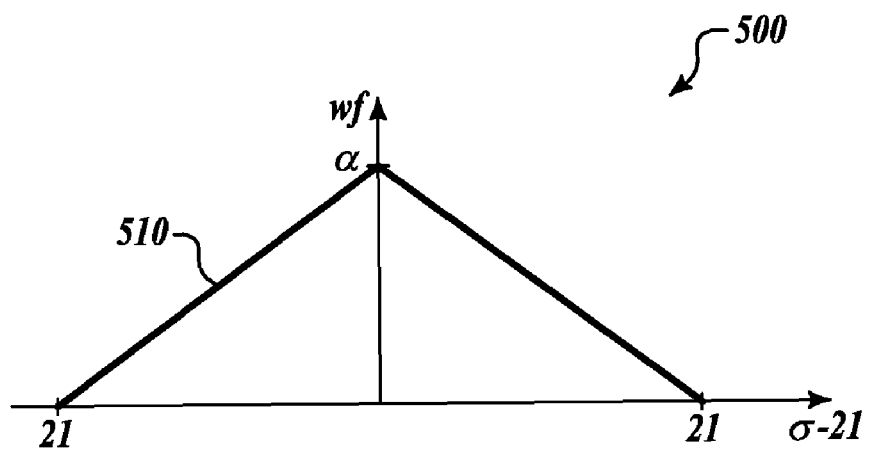
FIG. 5 illustrates example calculations of weighing factors.

FIG. 5 illustrates example calculations of weighting factors. The weighting factors can be calculated (after the variances have been calculated) using an example relationship as shown in FIG. 5. The weighting factor curve (500) can be chosen in accordance with the following factors. First, the variance is shown as being limited to a value between 0 and 42 since the width of each partition of the histogram is 84 (255 integer-divided by 3). The variance is lower when the histogram is concentrated within smaller ranges. When the histogram is concentrated within smaller ranges, a low weighting factor is used because an image with a concentrated histogram is susceptible to contouring.

The variance is higher, for example, when the histogram has two peaks at each extremity of the partition. For this case, contrast enhancement is not as beneficial and hence a low weighting factor is typically used. For other shapes of the histogram, the variance would range between 0 and 42 and the triangular shape curve is chosen. The level of enhancement is usually highest for a histogram having a mid-level variance and that tapers off in a linear fashion on both sides. Using a shape-based weighting of contrast enhancement helps to reduce artifacts such as contouring in the output image and changes the level of enhancement that is optimized for a particular image.

The peak of the triangularly shaped weighting factor curve 510 in FIG. 4 is different for each partition of histogram. Weighting factor curve 510 provides another control over the level of enhancement depending on the region of the image. For darker regions the curve is higher, which provides more enhancement in the darker regions of the image. The mid luma and bright regions of the image are enhanced to a lesser degree. Additionally, weighting factor curve 510 can be multi-segmented (or a sigmoid curve, for example) to allow, for example, steeper slopes near the wf axis, and less steep slopes further away.

With reference to FIG. 1, intelligent color remapper 130 is used for enhancing selected colors such as flesh tones, primary and complementary colors, and user-defined colors such as grass green, sky blue, and the like. The enhancements use intelligent bounding algorithms to substantially minimize artifacts.

Figure 6:
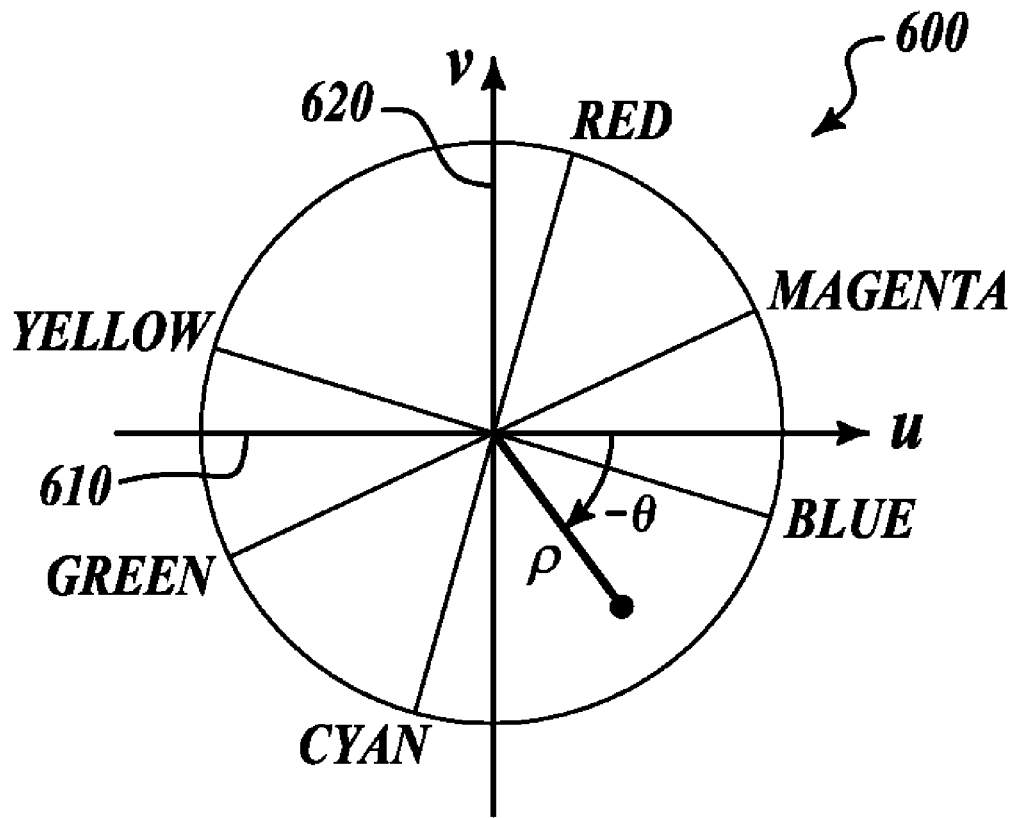
FIG. 6 illustrates the calculation of hue and chroma of an example YUV pixel.

FIG. 6 illustrates the calculation of hue and chroma of an example YUV pixel. The horizontal axis (610) of color wheel 600 represents the "U" component of a YUV pixel, while the vertical axis (620) of graph 100 represents the "V" component of a YUV pixel. When the chroma components Cb and Cr are represented with a range of −128 to 127 (by removing an offset of 128), the color space is often referred to as YUV. The axis U provides an offset removed representation of Cb and the axis V provides an offset removed representation of Cr.

Although transmission of video data is more convenient in YCbCr form because of the unsigned nature of data, most color enhancement operations are defined in terms of the U and V components. The angle defined by the UV vector with the U axis determines the hue of its color. The three primary colors—red, green and blue and their complementary colors yellow, magenta and cyan are spaced out circularly in the U-V plane with a separation of approximately 60°.

The example intelligent color remapper (130) receives an input pixel and identifies the color of a pixel of an incoming video data stream. The pixel's color is determined by calculating the hue θ of the pixel as shown in the Figure. The chroma ρ (rho) of the pixel indicates how vivid the color is. If the chroma is 0, the pixel is a gray level value while a higher chroma value indicates a more vivid or saturated color. Hue can be calculated in hardware by using look up tables for dividing v by u and for the inverse tangent operation. The accuracy of the calculated hue is affected by the resolution of the look up tables. Chroma is ordinarily more straightforward to calculate because the square root operation is usually not needed and most operations can be defined in terms of squared chroma.

By changing the hue of a pixel, it is possible to make colors appear to be much different than they originally were. For example, pixels that are close to red can be made "redder" by moving them closer to the red axis, or they can be made "less redder" by moving them away from the red axis. Hue can be changed by rotating the color vector by an angle φ counter clockwise about the origin as defined below:

$$\begin{pmatrix} u' \\ v' \end{pmatrix} = \begin{bmatrix} \cos\phi & \sin\phi \\ -\sin\phi & \cos\phi \end{bmatrix} \begin{pmatrix} u \\ v \end{pmatrix} \qquad (7)$$

Here u and v are the chroma components of the input pixel, while u' and v' are those of the output pixel after a rotation by φ degrees. The sine and cosine operations can be implemented using look up tables. Optimization can be done by storing only the sine values from 0° to 90° and noting that this is sufficient to calculate any other sine value. Also the cosine values can be calculated using the sine vales from 0° to 90°. The resolution of the look up table can be varied depending on the accuracy of the implementation.

The saturation of a pixel can be modified by moving it closer or away from the origin, while preserving its hue. The saturation of a pixel can be changed/modified by multiplying the UV components of the pixel by the same saturation factor sf as shown below:

$$\begin{pmatrix} u' \\ v' \end{pmatrix} = \begin{bmatrix} sf & 0 \\ 0 & sf \end{bmatrix} \begin{pmatrix} u \\ v \end{pmatrix} \quad (8)$$

Here sf is a positive multiplying factor that can range from 0 to a value such as 5. A saturation factor of zero moves the pixel to the origin. A picture whose pixels are processed by multiplying by a saturation factor of zero becomes a gray level picture (black and white). Saturation factors greater than one result in vivid and colorful pictures that usually look more visually pleasing than the original. Care should be taken with high saturation factors, because the resulting YUV pixels may become invalid when converted back to RGB values (which are more limited than YUV values). This can lead to artifacts such as patchiness, loss of details and incorrect changes of colors.

Figure 7:
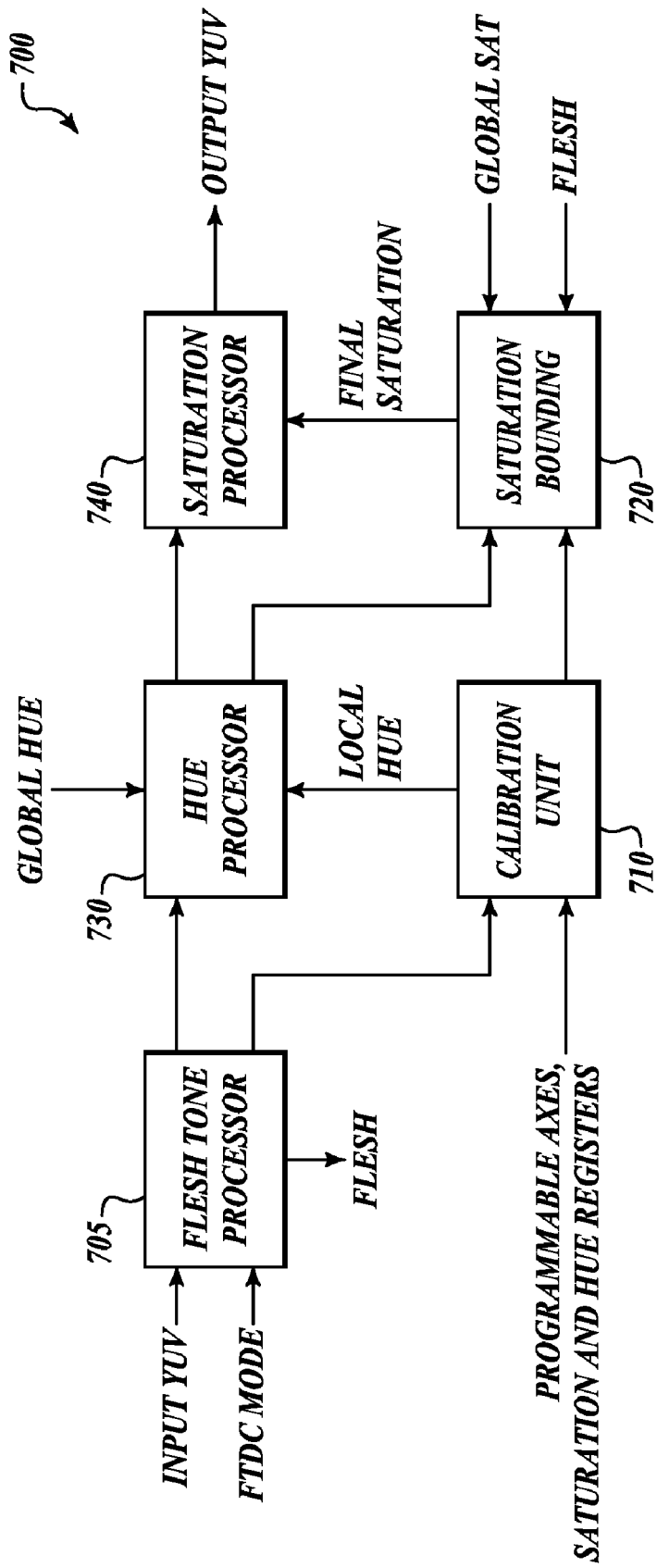
FIG. 7 is a block diagram of an example intelligent color remapping system

FIG. 7 is a block diagram of example intelligent color remapping system. The intelligent color remapping system (700) comprises a flesh tone processor (705), calibration unit (710), a bounded saturation unit (720), a hue processor (730), and a saturation processor (740).

In operation, the flesh tone processor (705) receives an input YUV pixel and detects flesh tones and corrects the flesh tones. Flesh tone detection is implemented using a programmable inner and outer hue range. For example, the inner range may be programmed to 110° to 140° and the outer range to 95° to 155°. Flesh tone detection also uses a programmable (squared) chroma range (e.g., 100-2750) and a programmable luma range (e.g. 44-235). Pixels within the inner hue range are assigned the maximum flesh bitmap, say 7 (for a 3 bit resolution), while those outside the outer range are assigned a value of 0 (zero). Flesh colored pixels falling in between are assigned values by interpolating equal sized regions in between the ranges and assigning flesh bitmap values from 1 to 6 in accordance with the interpolated region.

Figure 8:
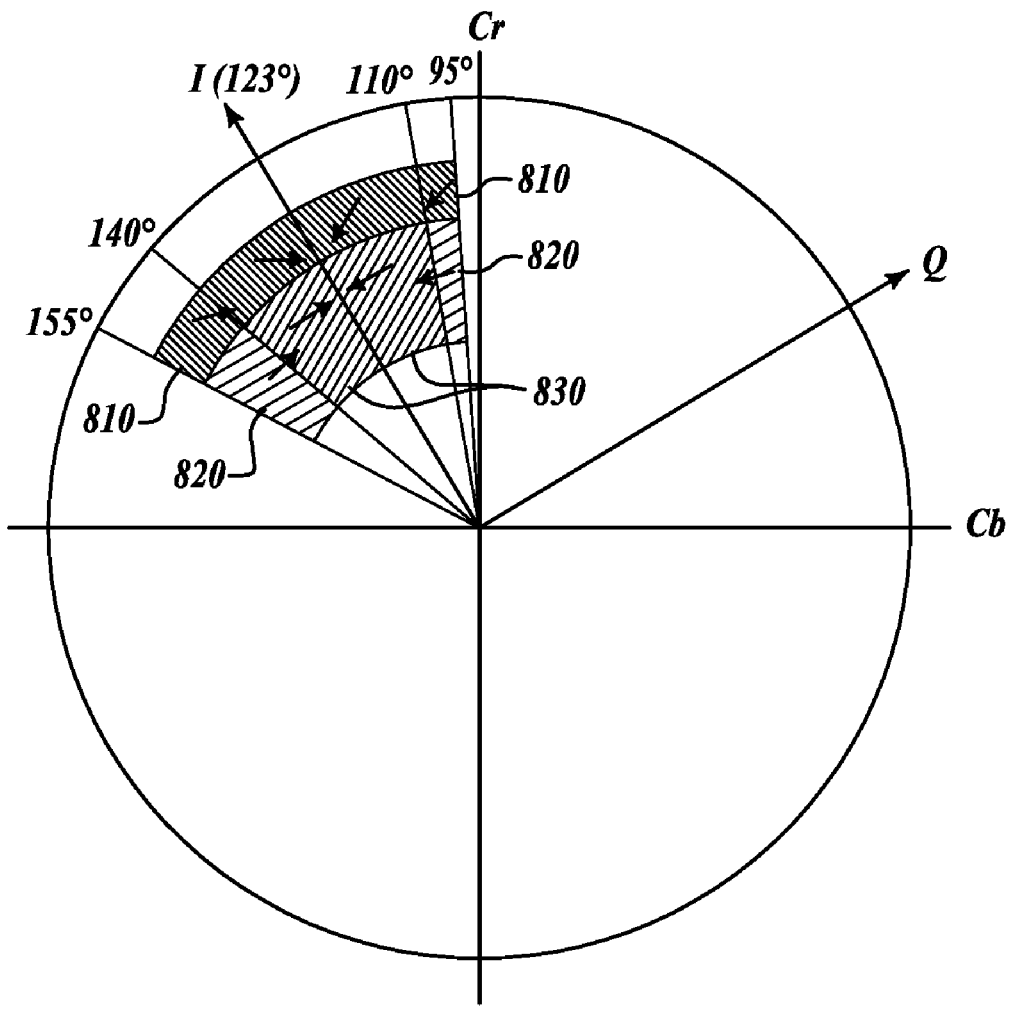
FIG. 8 illustrates flesh tone correction of an example YUV pixel.

In a similar fashion, different flesh bits can be assigned to pixels in accordance with their position with respect to the programmable chroma ranges. Thus the hue and chroma ranges divide the flesh tone area into different blocks. Each block may be assigned a different flesh bit and each flesh bit may be corrected/enhanced differently. FIG. 8 shows an example of this.

Flesh tone correction can be implemented in accordance with the following equation:

$$\begin{pmatrix} u' \\ v' \end{pmatrix} = \begin{pmatrix} c_1 & c_2 \\ c_3 & c_4 \end{pmatrix} \begin{pmatrix} u \\ v \end{pmatrix} + \begin{pmatrix} off_1 \\ off_2 \end{pmatrix} \quad (9)$$

This equation is flexible enough to implement any 2×2 linear transformation such as hue change, saturation change, q correction, I correction, and the like. Hardware can be used to implement the above equation, while software can be used to calculate/select the coefficients and offsets, which are then supplied to the hardware. Depending on the number of flesh detection bits, the number of values to be supplied to hardware increases. For example, a 2-bit q correction and a 1-bit i correction would comprise 48 registers (4×2×6=48).

FIG. 8 illustrates flesh tone correction of an example YUV pixel. Region 810 illustrates a region for I and Q correction. Region 830 illustrates regions where flesh tones fall within an outer hue range. Pixels having flesh tones within regions 810 and 830 are adjusted toward region 820, which is in the inner hue range. Accordingly, pixels having values in regions 820 are given a weighting of 1 to 2, whereas pixel having values in region 820 are given a weighting of 3. (Region 840 is the area outside of regions 810, 820, and 830.)

Referring again to FIG. 7, the calibration unit (710) receives programming information for controlling system 700 from, for example, an on-screen display (OSD), control registers, and the like. The calibration unit determines a local hue and a local saturation value in response to the programming information and an input YUV input pixel.

The input video stream in YUV format is first subjected to a change in hue and then a change in saturation. The hue and saturation changes are of two types—local and global. Local refers to changes that depend on a pixel's color while global changes are applied for the whole frame. The local hue and saturation changes for different colors are specified using a set of programmable color axes.

Hue processor 730 receives the input YUV pixel and transforms the hue of the input YUV pixel in response to the local hue value and a global hue value. Thus, for every input point, the final hue change $\phi$ is the sum of the local hue change and global hue change. This final hue change is then applied using equation (7). Bounded saturation unit 740 receives the hue-transformed pixel, the local saturation value, and a global saturation value and produces a final saturation value in response. Saturation processor 740 receives the hue-transformed YUV pixel and further transforms the saturation of the input YUV pixel in response to the final saturation value. The saturation processor outputs the transformed pixel as a YUV pixel.

An axis can be visualized as a spoke in the color plane wheel of FIG. 6. Each axis has a programmable position or angle (in terms of color hue), a hue change value and a saturation change value. By placing the set of axes at various positions around the color space wheel, different colors can be treated and enhanced separately. Local hue and saturation factors for each incoming pixel are calculated by evaluating the hue and saturation factors of the adjacent axes and interpolating between them. The final hue and saturation changes are a combination of the local change (which depends on the input pixel) and the global change (which is constant over the frame). The bounded saturation unit is used to prevent the occurrence of illegal YUV pixels when saturation changes are done. The concepts of color axes, calibration and calculation of local saturation and hue changes are explained below with reference to the following Figures.

Figure 9A:
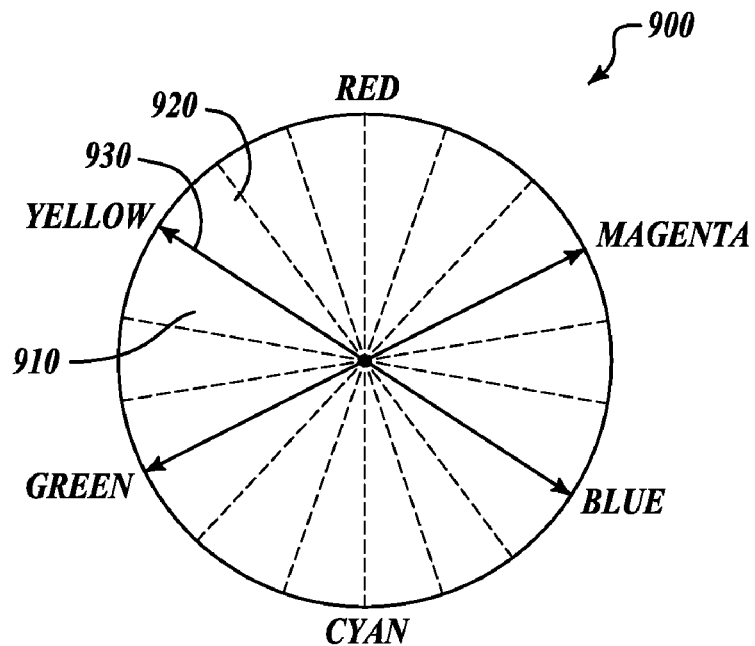
FIG. 9a illustrates an example YUV plane color wheel having six axes.

FIG. 9a illustrates an example YUV plane color wheel having six arrows that represent the three primary and three complementary colors. Each color region is delineated using two axes. The positioning of axes to enhance the above mentioned six colors is shown by the dotted lines (see lines 910 and 920, for example). The colors are shown using thick arrows and two axes that each lie on both sides of each arrow (see line 930, for example). The two axes act as the control for each color that lies between the two axes. The two axes are programmed to have the same saturation and hue change so that the effect is uniform for all the pixels within the two axes (bordering the color to be enhanced). Thus, 14 axes are required (two axes for each of the six colors plus the two fixed axes) in this example.

Table 1 shows the position of the 14 axes for the ITU-601 (SDTV) specification of the YUV color space. Because the six colors lie approximately sixty degrees apart, the two axes on either side of each color are chosen to be 15° away from the center of the color such that the angle subtended by the two axes is 30°. There is also a 30° separation between the axes of neighboring colors. The input points that lie between the axes of neighboring colors are processed with parameters calculated by interpolating between the parameters of the colors on either side.

TABLE 1

| Axis No. | Position in degrees | Color |
| --- | --- | --- |
| 0 | 0° | — |
| 1 | 5° | Blue |
| 2 | 37.5° | Magenta |
| 3 | 67.5° | Magenta |
| 4 | 95° | Red |
| 5 | 125° | Red |
| 6 | 155° | Yellow |
| 7 | 185° | Yellow |
| 8 | 217.5° | Green |
| 9 | 247.5° | Green |
| 10 | 275° | Cyan |
| 11 | 305° | Cyan |
| 12 | 335° | Blue |
| 13 | 360° | — |

Figure 9B:
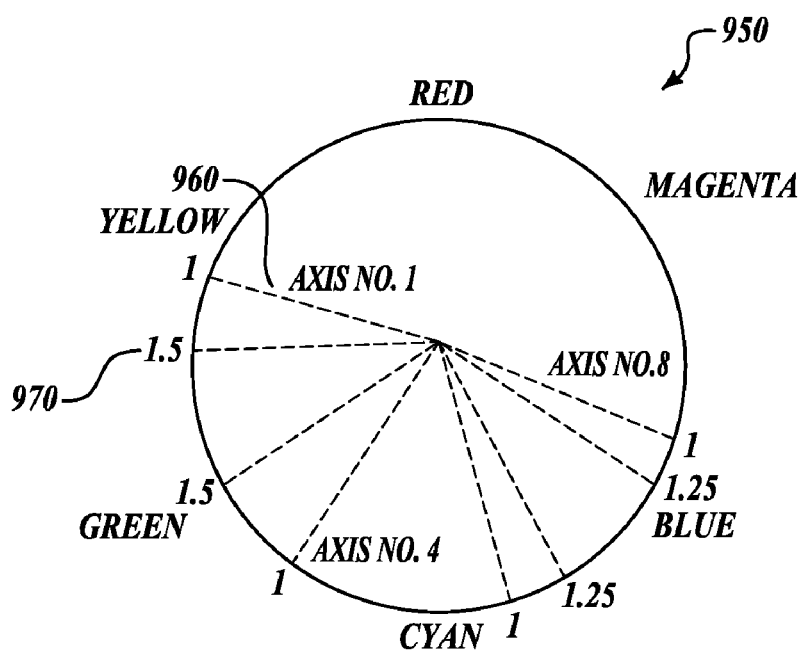
FIG. 9b illustrates an example YUV plane color wheel having eight axes

FIG. 9b illustrates an example YUV plane color wheel having eight axes. Four of the axes (960) of color wheel 950 are in the green region while the other four are in the blue region. This particular axis positioning enhances the greenish and bluish regions while leaving other colors unchanged. The numbers (970) radially adjacent to the axes are the saturation change factors (multiplicative). This is an example of saturation change, but hue change can be specified similarly.

Table 2 shows the positions of the axes and the saturation change factors for the example given in FIG. 9a, where the example system has a total of "N" axes assigned. The axes are defined in increasing order such that each position of axis n−1 is less than or equal to position of axis n (the hue is given as increasing from 0° to 360° in an anticlockwise direction). The roles of axis no. 0 and N−1 are explained below.

TABLE 2

| Axis No. | Position in degrees | Saturation Change |
| --- | --- | --- |
| 0 | 0° | 1.0 |
| 1 | 170° | 1.0 |
| 2 | 182° | 1.5 |
| 3 | 220° | 1.5 |
| 4 | 240° | 1.0 |
| 5 | 285° | 1.0 |
| 6 | 295° | 1.25 |
| 7 | 325° | 1.25 |
| 8 | 335° | 1.0 |
| . | . | . |
| . | . | . |
| . | . | . |
| N−1 | 360° | 1.0 |

Using the above example that the axes have been positioned in the color wheel and saturation change factors have been defined as in Table 2, the process for an example input pixel whose hue is 200° follows. A first step in the calibration process is to find the neighboring axes on either side of this pixel. In this case, axis number 2 and axis number 3 neighbor the input pixel. Because both of these axes have a saturation factor of 1.5, the input pixel is assigned a local saturation factor of 1.5.

Using another example input pixel having a hue of 232°, the neighboring axes are axis number 3 and axis number 4. Because the two neighboring axes have different saturation factors, the local saturation factor that should be assigned to the input pixel is calculated using a linear interpolation between the axis as shown in Equation (3) below. In general let axis_low=position of lower neighboring axis
axis_high=position of higher neighboring axis
sf_low=saturation change of lower neighboring axis
sf_high=saturation change of higher neighboring axis
lsf=local saturation to be assigned to input pixel
hue=hue of input pixel
Then using linear interpolation lsf can be calculated as $$lsf = sf\_high + (sf\_high - sf\_low)\frac{hue - axis\_high}{axis\_high - axis\_low}$$

Thus lsf lies in between sf_low and sf_high and takes values between them depending on the distance (in terms of degrees) between the input point and the two neighboring axes. It is noted that this is the general case and can be used for the previous example where hue was 200° such that sf_high and sf_low are the same, and thus lsf=sf_high=sf_low as mentioned above.

The same procedure can be used for points in the bluish region and depending on the input pixel, where the neighboring axes are chosen accordingly and the corresponding saturation factors are used to interpolate the local saturation factor of the input pixel using Equation (3).

Special axes are defined for use with pixels that do not lie between user-specified axes. For example, an input pixel having a hue of 100° would have to be treated as a special case if axis number 0 did not exist. To handle this and other such exceptions, two axes having fixed positions of 0° and 360° are defined. Because these two axes are theoretically the same, they are assigned the same saturation factor, in this case 1. Thus any input point having a hue of less than 170° can be considered to lie between axes 0 and 1 and can be treated in a way similar to the other points described above. Because only eight axes are used in the example, higher numbered axes (e.g., axes numbered 9, 10, . . . , N−1) can be set to position 360° and saturation change factor of 1.

Next, the reasoning behind the placement of the axes in this example is considered. An objective of placing axes numbered 1-4 is to enhance a core region of green by increasing the saturation of a specific range of "grass greens." The core "grass" region is defined by axis nos. 2 and 3 —182° to 220°. This region gets saturated by 1.5. A purpose of axes numbered. 1 and 4 is to define tapering regions on either side of the core region. If these tapering regions were not present, pixels that just lie inside the core region would be saturated by 1.5 while pixels that just lie outside the core region would be saturated by 1 (unchanged).

In an arbitrary real-world image of grass, each green pixel of the grass region is usually not exactly the same color. In other words, the various grass blades are of different shades and thus their hues are slightly different. It is quite possible that most pixels lie inside the core region, but many pixels lie just outside. Without the tapering regions, these two kinds of pixels undergo substantially different transformations and this could very well result in visible contouring of the picture. The tapering regions reduce this effect and produce a much cleaner picture.

The axes in the blue region enhance a specific range of blues, in this case "sky blues." Again a core region and tapering regions have been defined using axes nos. 5-8. All the other pixels that fall in the ranges 0°-170°, 240°-285° and 335°-360° remain untouched (saturation factor of 1). Thus the axis positioning of the example enhances the colors grass green and sky blue while keeping other colors unchanged.

Hue change is applied in the same manner as saturation change. The local hue change factor lhf can be calculated using the equation $$lhf = hf\_high + (hf\_high - hf\_low) \frac{hue - axis\_high}{axis\_high - axis\_low}$$

where hf_low and hf_high are the hue change factors of axis_low and axis_high respectively.

When an input pixel having a hue of 10° is encountered and axis numbers 0 and N−1 are not present, the interpolation can be troublesome since the neighboring axes are 1 and the last enumerated axis (the last axis defined before 360° in a counter-clockwise direction). This is because the neighboring axes lie on either side of the u-axis (hue=0° axis). To handle this case in a similar fashion to the others, we define axis no. 0 and axis no. N−1 to be positioned at 0° and 360° respectively such that the neighboring axes are axes numbers 0 and 1. It should also be noted that the saturation factors of axes numbered. 0 and N−1 can be defined to be the same value as the neighboring axes so that the color enhancement scheme is logically consistent with axes number 1 and the last enumerated axis before 360°.

One common application in video enhancement is the color adjustment of the three primary colors—red, green and blue and their complementary colors—cyan, magenta and yellow. In a TV application, the control parameters (hue and saturation changes in our framework) may come from an OSD.

In a manual mode, two axes are used to isolate each color, which allows for interpolation for points in between neighboring colors. The interpolation is limited to +/−15°. An on-screen display can be used to change saturation and hue of each color. To change position of the axes, an automatic mode can be used. The axis can be positioned by a user around at user-specified angles, with each axis having an associated saturation factor.

An automatic mode can be used to change colors that do not fall into a primary color, such as colors that might be encountered while processing video programs such as sports and indoor scenes. For example, the axes illustrated in FIG. 9b above, allow the system to enhance saturation of bluish and green areas by 1.25 and 1.5 respectively. The OSD can be used to switch between modes where each mode has programmed axes positions and saturation/hue changes.

The final saturation change sf for every input pixel is the product of its local saturation change (calculated from axis calibration) and the global saturation change. However since saturation changes are liable to cause YCbCr pixels to become invalid in RGB domain, the bounded saturation block calculates the maximum saturation each pixel can undergo while remaining valid. If this value is less than the final saturation for that pixel, it is used as the final saturation. Finally the pixel is saturated using Equation (8). It is noted that although the hue of a pixel may change after being processed by the hue processor (730), the saturation change parameters are typically calculated using the hue of the pixel before the hue change of the pixel, if any.

As mentioned above, bounded saturation unit 740 receives the hue-transformed pixel, the local saturation value, and a global saturation value and produces a final saturation value in response. Saturation of the video data can be accomplished using equation (8). Increasing the saturation is relatively simple—the input U and V values are multiplied by some saturation factor sat.

With respect to the U-V axis, changing the saturation can be visualized as moving the input $[u\ v]^t$ vector along a line through the origin and the original point. If sat is zero, the output point is $[0\ 0]^t$. An output point of $[0\ 0]^t$ corresponds to a black and white or gray level picture and having chroma components that are zero. If sat is greater than one, the input point is shifted away from the origin. In this case, the output point becomes more vivid or colorful than the original. Because increase of saturation changes the chroma components significantly, the output chroma point is susceptible to falling outside the valid YUV range, which is cuboid shaped.

To increase the saturation of YUV vectors while keeping them valid, it is instructive to study the effect of saturation increase in the RGB color space. Using the color space conversion and saturation equations presented above, the effect of video saturation on RGB color points can be translated using equation (11):

$$R_{out} = sat \times (R_{in} - Y) + Y$$

$$G_{out} = sat \times (G_{in} - Y) + Y$$

$$B_{out} = sat \times (B_{in} - Y) + Y \qquad (11)$$

Figure 10:
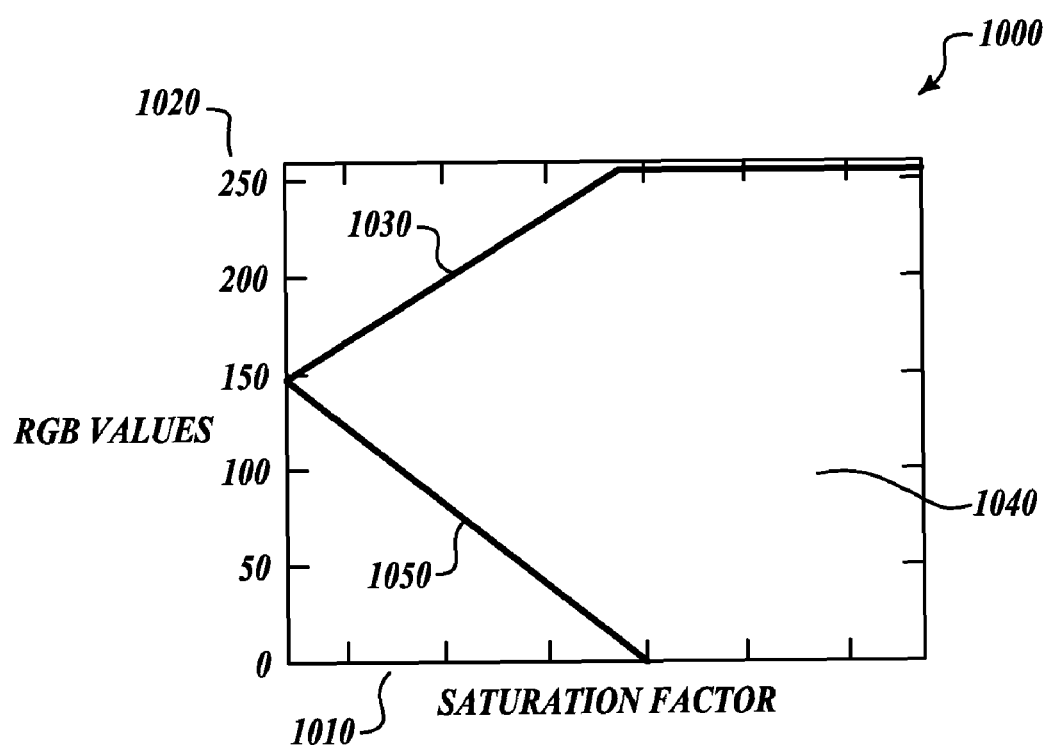
FIG. 10 is an example illustration of the effect of video saturation on an RGB color vector.

FIG. 10 is an example illustration of the effect of video saturation on an RGB color vector. The horizontal axis (1010) represents the saturation factor, and the vertical axis (1020) represents the RGB values. When sat is zero, the RGB values converge to the value of Y (approximately 150 in this example). As sat increases from 0, the RGB values vary in a straight-line fashion. The slopes of the red (1030), green (1040) and blue (1050) lines depend on the hue of the color point, and (as just mentioned) the intersection of the red, green and blue lines with the y-axis depends on the luminance of the color point.

In the Figure, the x-axis of saturation factor is calibrated with the original RGB values of the color point plotted with respect to sat of 1, and the luminance value plotted with respect to sat of 0. Smooth lines are drawn from the luminance value through each of the original R, G and B values to illustrate the three lines that represent the variation of red, green and blue values respectively.

From FIG. 10, it can be seen that if the saturation is increased arbitrarily, then one or more of the red, green and blue lines approach 0 or 255. The hue of the color determines the slopes of these lines and thus determines which line would reach 0 or 255 first. As long as the RGB values are within the 0-255 range the color point can be saturated further and appears more colorful and vivid. However, the saturation cannot be increased further beyond the point where one of the RGB lines hit 0 or 255. If saturation is increased further, the resulting RGB point is invalid.

In the example, the resulting RGB point occurs when the red line (1030) reaches the value 255. Even though the blue (1040) and green (1050) lines continue to vary in a linear fashion, the red line remains at the value 255. As the saturation is increased further, the blue reaches the value of 0 and remains there (along with red at 255) as green continues to change. Accordingly, the saturation increase should be stopped as soon as one color reaches the boundary of its range.

If the saturation continues beyond the maximum saturation point, the resulting color point undergoes a change of brightness and hue. The resulting picture has artifacts such as unnatural change in colors, loss of details etc. The effect of saturating the equivalent YUV point can be visualized as a shift of the point beyond the boundaries of the valid YUV cuboid. Although finding the boundaries of the valid YUV cuboid is a computationally expensive task, the problem of restricting the saturation can be easier to implement in the RGB domain.

Figure 11:
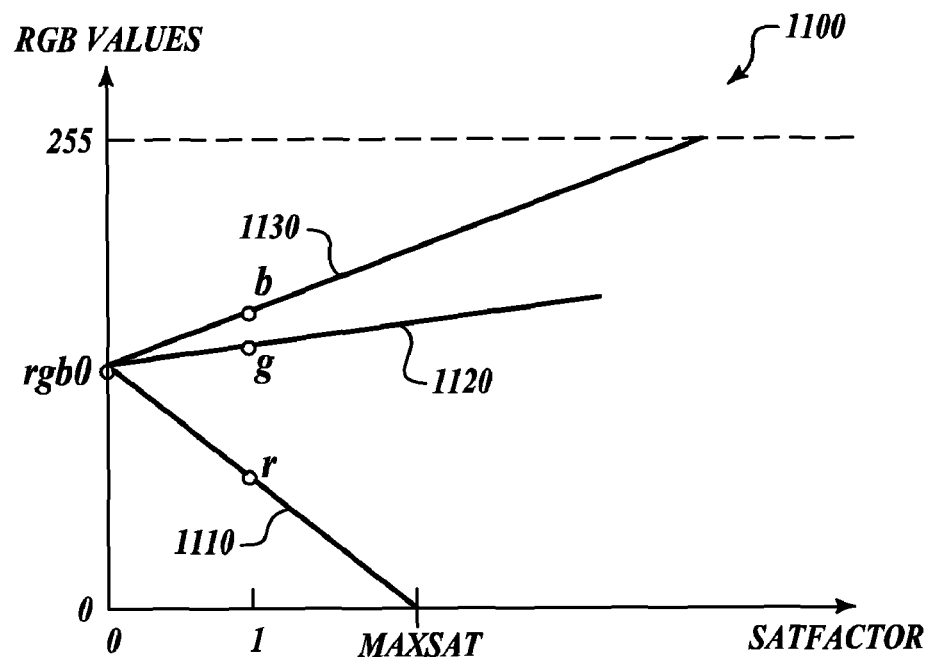
FIG. 11 is another example illustration of the effect of video saturation on an RGB color vector.

FIG. 11 is another example illustration of the effect of video saturation on an RGB color vector. The original RGB values r (1110), g (1120) and b (1130) are given for a pixel, which correspond to a saturation increase of 1. The luma value y can be calculated using the color space conversion equations above. The calculated luma value corresponds to a sat of 0. The intelligent saturation controller determines the maximum saturation (maxsat) the pixel can undergo before one of r, g or b is invalid. In this case, maxsat is the saturation at which red becomes 0.

To determine the maximum saturation, the equations of two lines are examined: the line through y and the maximum of r, g and b, and the line through y and the minimum of r, g and b. The saturation ($sat_1$) at which the first line reaches 255, and the saturation ($sat_2$) at which the second line reaches the value 0 are calculated. The lesser of $sat_1$ and $sat_2$ is chosen to be maxsat.

Let $bgr_{max}$=max(b, g, r) and $bgr_{min}$=min(b, g, r). From analytical geometry:

$$sat_1 = \frac{255 - y}{bgr_{max} - y} \quad (12)$$

and $$sat_2 = \frac{y}{y - bgr_{min}}$$

such that $$maxsat = \min(sat_1, sat_2) = \min\left(\frac{255 - y}{bgr_{max} - y}, \frac{y}{y - bgr_{min}}\right) \quad (13)$$

Using Equation (13), each frame of the incoming video signal can be saturated by calculating the maximum saturation of each pixel of the frame and constraining the amount of saturation applied such that it equals or falls below that maximum value. For example, if it is desired to saturate a picture by a factor of 2, each pixel of the frame is examined to see whether its individual maxsat is greater than two. If the maxsat of a particular pixel is greater than two, then this pixel can be saturated by two without any artifacts. If however, its maxsat is less than two, say 1.75, then this pixel is saturated by 1.75 only.

Thus each pixel may be saturated to a different extent depending on its maxsat value, which in turn depends on its RGB values. When the incoming pixels are YUV, they are first converted to RGB to determine their maximum saturation values. The actual increase of saturation can be done in either YUV or RGB domains using the equations presented earlier.

An example algorithm for intelligent saturation of video signals is:

For each incoming pixel do:
1. If the incoming pixel is YUV, find the corresponding RGB values. They correspond to sat of 1
2. If the incoming pixel is RGB, find its luminance. This is the RGB value for a sat of 0
3. Calculate $bgr_{max}$ and $bgr_{min}$
4. Use the above values to calculate $sat_1$, $sat_2$ and hence maxsat
5. Let insat be the input or desired saturation, and outsat be the output saturation value to be computed as
   a. If insat is less then or equal to maxsat, let outsat=insat
   b. If insat is greater than maxsat, let outsat=maxsat
6. Calculate the output color point using either the RGB or YUV saturation equations with outsat as the saturation factor The example algorithm is relatively simple to implement in hardware. The division can be computed using an 8-bit deep lookup table. Notwithstanding the lookup table, no large memory elements are required.

Many digital video processing tasks are performed in the YCbCr domain since they are well defined in this color space. During the course of video processing, pixels that were valid RGB pixels may be shifted out of the valid YUV cuboid. Usually when these pixels are converted back to RGB, the RGB values are clamped to 0 and 255. A similar situation exists when RGB values are mapped to conform to different display devices that have different color gamuts using transformations such as those specified by the sRGB standard. In such situations, an input RGB point is often mapped to an output RGB point that falls outside the 0-255 range.

"Correcting" an invalid pixel by de-saturating the pixel until it falls within the 0-255 range ensures the output pixel value maintains the same brightness and hue as the transformed but invalid pixel. The method of de-saturation operates in accordance with the method of intelligently increasing the saturation as described above.

Figure 12:
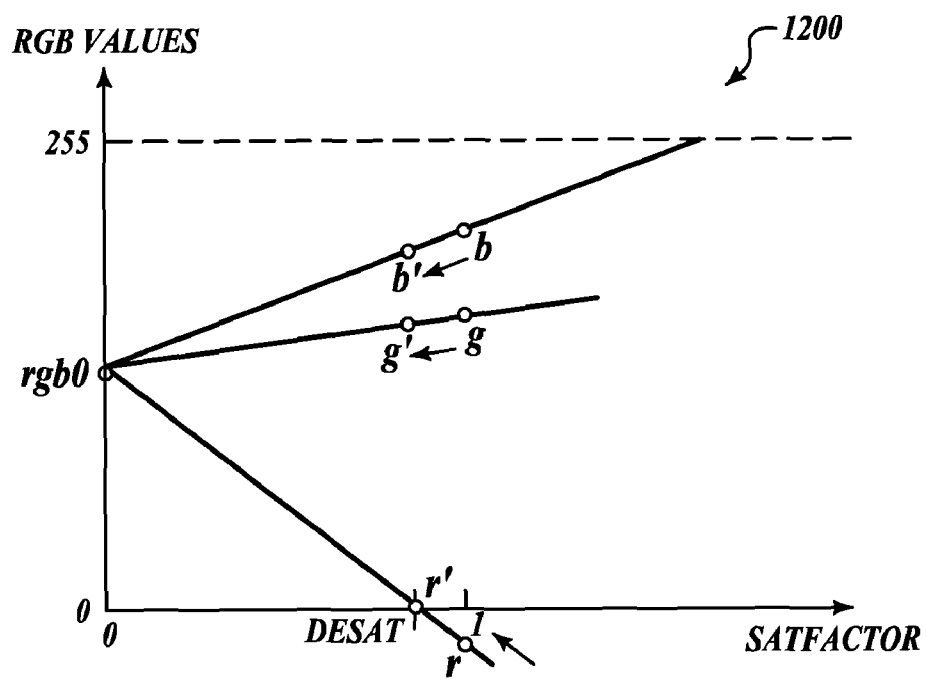
FIG. 12 shows an example of de-saturating an invalid pixel.

FIG. 12 shows an example of de-saturating an invalid pixel. The invalid pixel has one or more of its RGB values outside the 8-bit valid range. Graph 1200 shows that the value for r is less than 0. The invalid pixel corresponds to a sat of 1, while its luma value y corresponds to a sat of 0. The problem is to determine the value of de-saturation required, desat, that brings the pixel into valid range. The value of desat ranges from 0 to 1. The method to compute desat can use the same equations that were used to compute maxsat, as in Equation (13) above.

Once desat has been computed, the invalid pixel can be de-saturated using the saturation equations shown earlier. As with the computation of maxsat, desat must be computed on a pixel-by-pixel basis, obviously for invalid pixels only. But since the RGB values of an invalid pixel are outside the 0-255 range, the depth of the division LUT (look up table) will now be greater than 8 bits and the size of the multipliers would now be increased.

Referring again to FIG. 1, an sRGB compliance unit (140) receives color-adjusted pixels from intelligent color remapper (130) to produce a video display that is uniform over different monitors. The sRGB compliance unit can perform brightness, contrast and hue operations and can be combined with a YUV-to-RGB color converter. The output can be 9-bit RGB, which is then converted by gamut compression unit 150, described below. The unit can perform transformations in accordance with the following formula:

$$\begin{pmatrix} y'_{out} \\ u_{out} \\ v_{out} \end{pmatrix} = \begin{pmatrix} cont & 0 & 0 \\ 0 & \cos(hue) & -\sin(hue) \\ 0 & \sin(hue) & \cos(hue) \end{pmatrix} \begin{pmatrix} y'_{in} \\ u_{in} \\ v_{in} \end{pmatrix} + \begin{pmatrix} br \\ 0 \\ 0 \end{pmatrix}$$

where y' is the luma and u and v are the chroma channels.

Let $x = (y'_{in}, u_{in}, v_{in})^T$ = input pixel
$y = (y'_{out}, u_{out}, v_{out})^T$ = globally transformed pixel
$z = (r, g, b)^T$ = output pixel after color conversion
G, H = 3×3 Global transform matrix, 3×1 offsets
C, D = 3×3 Color transformation matrix, 3×1 offsets
Therefore $$z = Cy + D = C(Gx + H) + D \quad A = CG = 3 \times 3 \text{ matrix}$$
$$= (CG)x + (CH + D)$$
$$z = Ax + B \qquad\qquad B = CH + D = 3 \times 1 \text{ matrix}$$

Since pixels need to be stored with offsets, we derived a generalized transform, $$z = Ax_{\textit{off}} + B + Q$$

where $x_{\textit{off}} = x + V$ and $Q = (C - A)V$.

The purpose of sRGB compliance is to process an input video signal such that it appears to be the same when viewed across different displays. Given an input RGB triplet, the output triplet will usually look nearly the same across different displays.

The transformation for sRGB compliance can be written as:

$$(RGB_{out}) = \Gamma^{-1}{}_m S^{-1}{}_m T^{-1}{}_m T_{sRGB} S_{sRGB} \Gamma_{sRGB}(RGB_{in})$$

where
Γ = gamma function
S = 3×3 scaling (diagonal) matrix
T = 3×3 CSC (screen colors to XYZ) matrix, and
sRGB refers to the standard while m refers to monitor specific values.

The term $S^{-1}{}_m T^{-1}{}_m T_{sRGB} S_{sRGB}$ can be combined into a single 3×3 matrix, say A. This matrix is typically unique for each display. These matrices are combined together instead of $S^{-1}{}_m T^{-1}{}_m$ and $T_{sRGB} S_{sRGB}$ so that the color management functions do not need to operate on XYZ and the precision of XYZ triplets is not a factor. $\Gamma^{-1}{}_m$ is performed using the gamma correction block at the end of the CMU pipeline.

If the display gamut does not completely enclose the sRGB gamut, the output RGB triplets may fall outside valid range. When the output RGB triplets fall outside the valid range, the gamut compression block desaturates them till they fall within the valid range using the desaturation approach described above. Thus the gamut compression block maintains pixel validity in color space conversion and sRGB compliance.

Gamma correction is performed to compensate for nonlinear characteristics of output displays. Gamma correction block 160 typically comprises three 8-bit input to 10-bit output Look Up Tables (LUT) for each R, G and B channel. Using a 10-bit output reduces quantization noise when implementing nonlinear functions. A dither block can be used on the gamma corrected output to increase the apparent color resolution of a display that has lower resolution than the original video signal.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

We claim:

1. A method for processing a video signal, comprising:
   calculating a weighting factor independently for each of a plurality of regions of luminance values;
   equalizing each of the plurality of regions of luminance values, based on the independently calculated weighting factors, to produce a contrast enhanced video signal using an adaptive contrast enhancer circuitry;
   remapping the video signal to produce a color enhanced video signal wherein selected colors of the video signal are enhanced using intelligent color remapper circuitry; and
   display adapting the contrast enhanced video signal and the color enhanced video signal.

2. The method of claim 1, further comprising converting pixels of the video signal from RGB coordinates to YUV coordinates.

3. The method of claim 1, wherein colors of the color enhanced video signal are remapped in response to linear interpolation of neighboring axes on a color wheel.

4. The method of claim 1, wherein colors of the color enhanced video signal are remapped in response to flesh tone, hue, and saturation parameters.

5. The method of claim 4, further comprising converting a video signal output, from the display adapting process, from YUV coordinates to RGB coordinates.

6. The method of claim 5, further comprising desaturating the converted video signal output to fall within a valid range for an RGB display.

7. The method of claim 6, further comprising gamma compensating the desaturated converted video signal output to compensate for nonlinear characteristics of output displays.

8. The method of claim 1, further comprising implementing the contrast enhancement, remapping, and display adapting using an integrated circuit.

9. A system, comprising:
   an adaptive contrast enhancer that is configured to:
      calculate a weighting factor independently for each of a plurality of regions of luminance values, and
      equalize each of the plurality of regions of luminance values, based on the independently calculated weighting factors;
   an intelligent color remapper that is configured to enhance selected colors; and
   an sRGB compliance unit that is configured to receive video signal output of the adaptive contrast enhancer and the intelligent color remapper, and to process the video signal output such that the processed video signal output is in accordance with characteristics of a particular display.

10. The system of claim 9, further comprising a color space converter that is configured to convert pixels of the processed video signal from RGB coordinates to YUV coordinates.

11. The system of claim 9, wherein the intelligent color remapper is configured to map colors in response to a linear interpolation of neighboring axes on a color wheel.

12. The system of claim 9, wherein the intelligent color remapper comprises flesh tone, hue, and saturation processors.

13. The system of claim 9, wherein the sRGB compliance unit comprises a YUV to RGB converter for converting the processed video signal output.

14. The system of claim 13, further comprising a gamut compression block that is configured to desaturate the converted processed video signal output to fall within a valid range for an RGB display.

15. The system of claim 14, further comprising a gamma correction unit that is configured to gamma compensate the desaturated converted processed video signal output to compensate for nonlinear characteristics of the display.

16. The system of claim 9, wherein the system is implemented on an integrated circuit.

17. A system for processing a video signal, comprising:

means for calculating a weighting factor independently for each of a plurality of regions;

means for equalizing each of the plurality of regions of luminance values, based on the independently calculated weighting factors, to produce a contrast enhanced video signal;

means for remapping the video signal to produce a color enhanced video signal wherein selected colors of the video signal are enhanced; and means for display adapting the contrast enhanced video signal and the color enhanced video signal.

18. The system of claim 17, further comprising means for converting pixels of the video stream from RGB coordinates to YUV coordinates.

19. The system of claim 17, wherein the means for remapping the video signal remaps colors in response to linear interpolation of neighboring axes on a color wheel.

20. The system of claim 17, further comprising means for processing flesh tone, hue, and saturation of a video signal output.

* * * * *